United States Patent
Miller

(10) Patent No.: US 8,470,290 B1
(45) Date of Patent: Jun. 25, 2013

(54) METHODS AND APPARATUS FOR INDUSTRIAL WASTE RECOVERY

(75) Inventor: Stacy Miller, Pitkin, LA (US)

(73) Assignee: Boise Packaging & Newsprint, L.L.C., Boise, ID (US)

(*) Notice: Subject to any disclaimer, the term of this patent is extended or adjusted under 35 U.S.C. 154(b) by 971 days.

(21) Appl. No.: 12/367,101

(22) Filed: Feb. 6, 2009

Related U.S. Application Data

(60) Provisional application No. 61/065,108, filed on Feb. 8, 2008.

(51) Int. Cl.
*C01B 13/14* (2006.01)

(52) U.S. Cl.
USPC ........... 423/636; 423/155; 423/175; 423/637; 423/177; 432/106; 432/109; 432/111; 432/19; 432/105; 432/115; 432/117; 432/113; 110/106; 110/261; 110/265; 110/347; 110/263

(58) Field of Classification Search
None
See application file for complete search history.

(56) References Cited

U.S. PATENT DOCUMENTS

| | | | | |
|---|---|---|---|---|
| 4,387,654 A | * | 6/1983 | Binasik et al. | 110/347 |
| 4,391,671 A | * | 7/1983 | Azarniouch | 162/30.1 |
| 4,606,722 A | * | 8/1986 | Olauson | 432/14 |
| 4,746,290 A | * | 5/1988 | DeCicco et al. | 432/19 |
| 4,822,379 A | * | 4/1989 | Thompson | 44/589 |
| 4,993,942 A | * | 2/1991 | Boyden et al. | 432/14 |
| 5,667,376 A | * | 9/1997 | Robertson et al. | 431/115 |

OTHER PUBLICATIONS

Day et al (NPL: "Evaluation of Hazardous Waste Incineration in a Lime Kiln: Rockwell Lime Company" Journal of Hazardous Materials, 12, 1985 pp. 312-321).*
Statement by Stacy Miller dated Jul. 28, 2010, 3 pages.

* cited by examiner

*Primary Examiner* — Melvin C Mayes
*Assistant Examiner* — Smita Patel
(74) *Attorney, Agent, or Firm* — Klarquist Sparkman, LLP

(57) ABSTRACT

This application concerns methods and apparatus for use in industrial waste recovery operations such as recovery of non-consumed chemicals in industrial processes, with recovery of quick lime in a wood pulp process being an example. In some embodiments, methods comprise baking lime sludge in a kiln and controlling a temperature in a calcining zone of the kiln to be above about 2250° F. to vaporize sodium contained in the lime sludge. Interaction of the vaporized sodium with $SO_x$ can deter accumulation of one or both of $CaCO_3$ and $CaSO_4$ on one or more inner surfaces of the kiln. In some embodiments, lime sludge can be rinsed to generate a filtrate comprising dissolved NaOH, and the filtrate can charge a scrubber for removing $SO_x$ from an exhaust from the kiln. Embodiments of co-fired burners for heating such kilns by burning petroleum coke and natural gas are also disclosed.

19 Claims, 3 Drawing Sheets

METHODS AND APPARATUS FOR INDUSTRIAL WASTE RECOVERY

CROSS REFERENCE TO RELATED APPLICATION

This application claims priority to and the benefit of U.S. Provisional Patent Application 61/065,108, filed Feb. 8, 2008, which is hereby incorporated.

FIELD

This application concerns methods and apparatus for use in industrial waste recovery operations such as recovery of non-consumed chemicals in industrial processes, with recovery of quick lime in a wood pulp process being an example.

BACKGROUND

In making paper and other pulp products, cellulosic fiber, such as for example wood, is chemically digested in a continuous or a batch process. Usually, the fiber is charged together with a cooking liquid such as a white liquor having certain desirable chemicals for dissolving a majority of the lignin contents of the wood. Pulp so formed is typically washed or rinsed, and separated from the cooking liquid. The filtrate from the rinse forms a weak black liquor.

As used herein, "black liquor" means the waste product that results from separating the pulp from the cooking liquid subsequent to digesting the cellulosic fiber. Black liquor is usually rich in valuable chemicals, some of which can be recovered to produce additional and/or cooking liquid for use in the digester. For example, black liquor can be concentrated by evaporating a major portion of its water contents in an evaporation plant and some of the chemicals can be recovered in the form of $Na_2CO_3$. The concentrated black liquor is combusted in a recovering furnace to produce desirable process steam and a smelt having certain desirable chemicals that can be dissolved in water to form a green liquor.

The $Na_2CO_3$ (sodium carbonate) is used to produce NaOH (sodium hydroxide), an ingredient used to produce the cooking liquid, by treating the concentrated green liquor with burnt lime, also known as quick lime, (CaO). The causticizing reaction just described and used to produce the sodium hydroxide is shown in Equations 1 and 2.

$$CaO + H_2O \rightarrow +Ca(OH)_2 + Heat \quad \text{Equation 1}$$

$$Na_2CO_3 + Ca(OH)_2 \rightarrow 2NaOH + CaCO_3 \quad \text{Equation 2}$$

An additional recovery process is usually applied to "close" the cycle and recover quick lime from the lime sludge (also known as lime mud), which includes $CaCO_3$. NaOH and solutions with dissolved NaOH, such as aqueous NaOH, can also be recovered from the lime sludge. After rinsing, the lime sludge is heated in a lime kiln to evaporate any remaining water, and then heated further in a reburning process to recover the quick lime according to the stoichiometric reaction shown in Equation 3.

$$CaCO_3 + energy \rightarrow CaO + CO_2 \quad \text{Equation 3}$$

Many kilns used to recover quick lime from lime sludge are heated by a continuous heat source, such as by continuous combustion of natural gas. Fuel costs for kilns heated only by combustion of natural gas are high, and combustion of natural gas only usually leads to peak flame temperatures in excess of 2800° F., which undesirably forms oxides of nitrogen ($NO_N$). In addition, some chemicals in the cooking liquid and green liquor (and thus the lime sludge), as well as natural gas, contain sulfur. Consequently, the high combustion temperature of natural gas usually forms oxides of sulfur ($SO_x$) in addition to the $NO_N$, which makes compliance with emissions requirements difficult.

SUMMARY

Methods for recovering lime from a manufacturing process are disclosed. Such methods include baking lime sludge in a kiln and controlling a flame temperature of a flame so that a temperature in a calcining zone of the kiln is above about 2250° F. to vaporize sodium contained in the lime sludge. Interaction of the vaporized sodium with $SO_x$ deters accumulation of one or both of $CaCO_3$ and $CaSO_4$ on one or more inner surfaces of the kiln.

A fluid fuel can provide a continuous ignition source for co-firing a pulverized solid fuel. The fluid fuel can be natural gas, and a flow rate of the natural gas can be between about 10 MCF and about 20 MCF. Petroleum coke can be co-fired with natural gas to produce the flame. In some embodiments, natural gas is continuously burned as a primary ignition source, and petroleum coke is injected into the primary ignition source from above.

The act of controlling the flame temperature can comprise one or more of selecting a volumetric flow rate of an oxidizer, selecting a volumetric flow rate of a fuel-supply inlet stream carrying entrained particles of petroleum coke, and selecting respective flow rates of petroleum coke and fluid fuel. A volumetric flow rate of a fuel-supply stream can be between about 550 CFM and about 850 CFM. A flow rate of petroleum coke can be between about 50 pounds per minute and about 60 pounds per minute.

Other methods of recovering lime are also disclosed. Such methods include rinsing a lime sludge with a rinse to generate a filtrate comprising dissolved NaOH and baking the rinsed lime sludge in a kiln exhausting at least some $SO_x$. At least a portion of the $SO_x$ can be scrubbed from the exhaust in a scrubber at least partially charged with the filtrate comprising dissolved NaOH. Quick lime can be removed from the kiln.

Kilns for recovering lime are also disclosed. Some such kilns have an entrance region for receiving lime sludge, and define a calcining region disposed opposite the entrance region. A co-fired burner for burning pulverized solid fuel can be located in or near the calcining region. The co-fired burner can include a fluid-fuel injector for providing a continuous ignition source and an injector body positioned above the fluid-fuel injector for injecting a pulverized solid fuel downwardly into the continuous ignition source. As noted above, the pulverized solid fuel can be petroleum coke.

In some kilns, the fluid-fuel injector comprises one or more turning vanes for mixing a fluid fuel with an oxidizer. The injector body can comprise a nozzle for turning a stream of the solid fuel between about 15 degrees and about 25 degrees. Some injector bodies comprise a tube having an inner-diameter of about 4 inches. Petroleum coke can be injected by such an injector body. In at least some kilns, the calcining region is positioned below the co-fired burner.

Systems for recovering lime are also disclosed. Such systems include a lime sludge washer for rinsing a lime sludge with a rinse and producing a filtrate. A scrubber in fluid connection with the washer can receive the filtrate from the washer. The filtrate can comprise a solution of NaOH. A kiln for baking lime sludge can have an exhaust in fluid connection with the scrubber for exhausting kiln exhaust products at least partially through the scrubber. The scrubber can be configured to scrub $SO_x$ from the kiln exhaust products with the filtrate.

Kilns as disclosed herein can be used in such systems. For example, kilns having a co-fired burner can be used in such systems. Such co-fired burners can include a first injector for injecting natural gas for providing a continuous ignition source inside the kiln and a second injector positioned above the first injector comprising a nozzle for injecting a stream of petroleum coke into the continuous ignition source.

The foregoing and other features and advantages will become more apparent from the following detailed description, which proceeds with reference to the accompanying drawings.

DETAILED DESCRIPTION

The following describes embodiments of methods and apparatus for recovering materials from industrial waste, such as recovering lime from a pulp process.

The following makes reference to the accompanying drawings which form a part hereof, wherein like numerals designate like parts throughout. The drawings illustrate specific embodiments, but other embodiments may be formed and structural changes may be made without departing from the intended scope of this disclosure. Directions and references (e.g., up, down, top, bottom, left, right, rearward, forward, heelward, etc.) may be used to facilitate discussion of the drawings but are not intended to be limiting. For example, certain terms may be used such as "up," "down,", "upper," "lower," "horizontal," "vertical," "left," "right," and the like. These terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface, and the object remains the same.

Accordingly, the following detailed description shall not be construed in a limiting sense.

Exemplary Liquor Cycle

Figure 1:
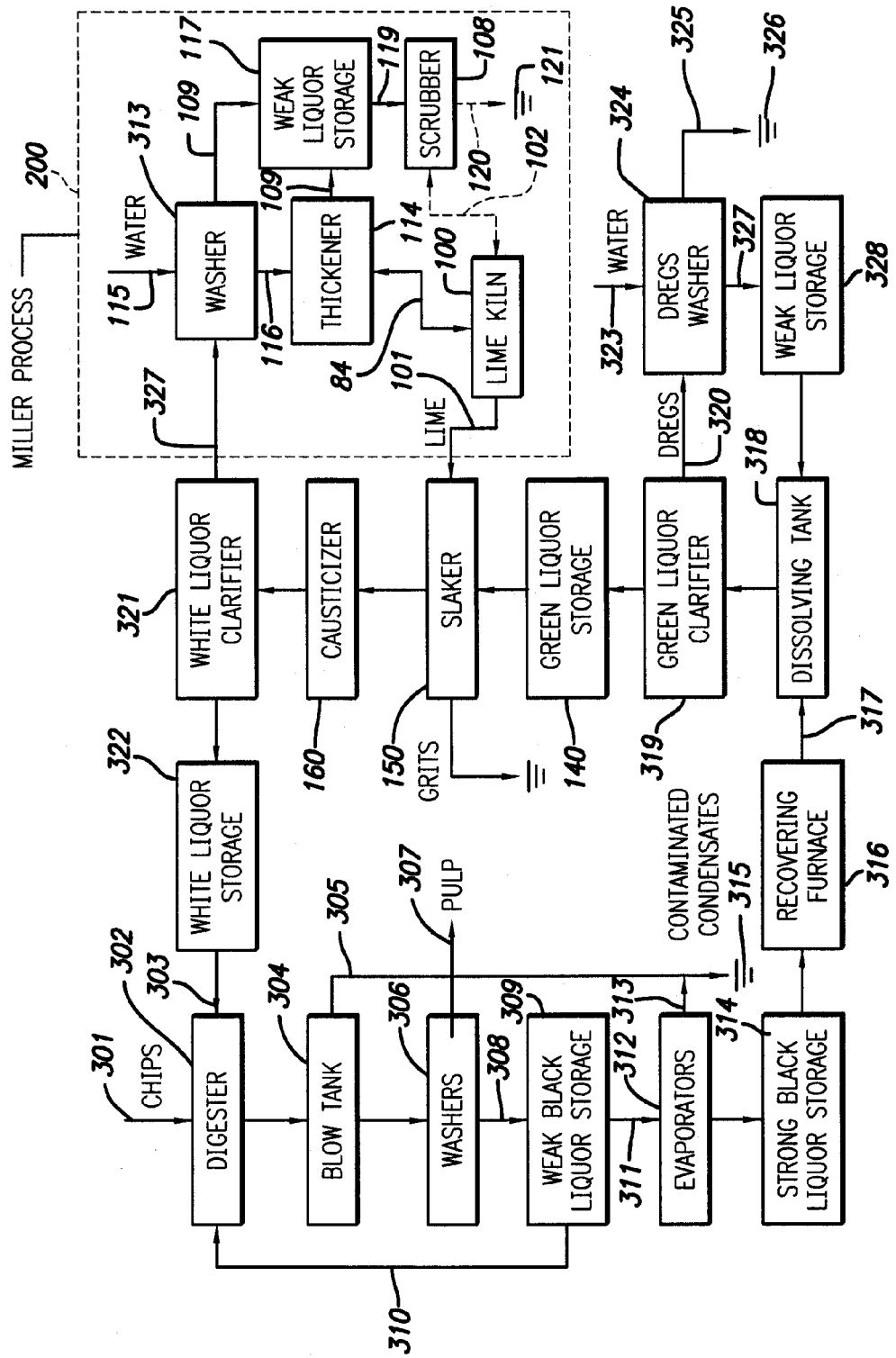
FIG. 1 illustrates an exemplary liquor cycle in a wood pulp manufacturing process.

FIG. 1 illustrates an exemplary liquor cycle in an exemplary wood pulp manufacturing process. In the cycle shown in FIG. 1, wood chips 301 are combined with a cooking liquid that includes a mixture of white liquor 303 and black liquor 310 in a digester 302. Gases from the digester 302 are transferred (e.g., by a pressure differential) to a blow tank 304 where they are condensed and discarded as a waste product 305 to a suitable waste site 315.

The mixture of digested chips and cooking liquid is moved to a washer apparatus 306 where the pulp 307 is rinsed, such as for example by water, and separated from the mixture. The filtrate 308 is moved to a weak black liquor storage 309. A portion 310 of the weak black liquor can be used to at least partially recharge the digester 302.

The remaining weak black liquor 311 is concentrated by evaporating excess volatiles, including water, in one or more evaporators 312. The gaseous products of evaporation 313 are blown off and condensed to be disposed of in the suitable waste site 315. The black liquor so concentrated is stored in a strong black liquor storage apparatus 314 before entering a recovering furnace 316 where the black liquor is baked to form smelt 317.

The smelt 317 is dissolved in a dissolving tank 318 and the resulting solution, green liquor, is transferred to a green liquor clarifier 319. Dregs 320 are filtered out and transferred to a dregs washer 324 where the precipitated dregs are washed, for example, with water 323. The resulting filtrate 327 can be stored in a weak liquor storage 328 and recombined with the smelt 317 in the dissolving tank 318. The washed dregs 325 can be disposed of and transferred to a suitable waste site 326.

The green liquor filtrate from the green liquor clarifier 319 can be stored in a green liquor storage 140 and/or transferred to a slaker 150. In the slaker 150, the green liquor is combined with lime 101. By combining the green liquor and the lime 101, the reaction of Equation 1 occurs. The reaction of Equation 2 can also be carried out in the slaker 150, but as the reaction drives toward completion, it slows. The resulting mixture containing NaOH and $CaCO_3$ can then be transferred to the causticizer 160 after removing the grits for disposal. While in the slaker 150 and the causticizer 160, the mixture can be kept well agitated to assist completion of the reaction and to prevent precipitation of the $CaCO_3$. The causticizer 160 can be used to allow more time for the reaction of Equation 2 to complete.

The products of Equation 2, including precipitated $CaCO_3$ and NaOH in solution, can be transferred to the white liquor clarifier 321 where the white liquor can be filtered and transferred to the white liquor storage 322. The clarifier 321 provides residence time and slow movement to allow the $CaCO_3$ to settle to the bottom of the clarifier. The corresponding lime mud ($CaCO_3$) 327 can be collected from the bottom of the clarifier and transferred to the lime recovery cycle 200, which can be referred to as the "Miller Process."

In the lime recovery cycle 200, the lime sludge 327 can be transferred to the lime mud washer 113 where the lime sludge 327 can be rinsed with a rinse 115 capable of dissolving NaOH in solution, e.g., water for an aqueous solution of NaOH. Filtrate 109 from the lime mud washer 113 containing a solution of NaOH, such as aqueous NaOH, can be transferred to a weak liquor storage 117. A solution 119 containing sodium ion, such as for example stored weak liquor (e.g., the filtrate 109) can be fed to a scrubber 108 for scrubbing gas products 102 emitted from the kiln 100. Such scrubbing is described in more detail below.

The washed lime sludge 116 can be transferred to a lime sludge thickener 114 (referred to as a "lime mud precoat filter" in FIG. 2 and the corresponding description below) for thickening the lime mud 116 by, for example, vacuum removal of rinse solution through a filtration assembly. Additional filtrate 109 collected from the lime sludge thickener 114 can be transferred to the weak liquor storage 117. As described in further detail below, a lime mud thickener 114 can be located at an entrance of a kiln 100 in some embodiments. Once sufficiently thickened, the lime sludge 84, (e.g., primarily $CaCO_3$) can be transferred to a lime kiln 100 (or a baking region thereof, such as a calcining region) and baked at a sufficiently elevated temperature to cause the $CaCO_3$ to undergo the reaction of Equation 3. The resulting CaO (lime) 101 can then be removed from the lime kiln and readied for transfer to the slaker 150.

The lime kiln gases 102, for example from combustion of the fuel used to heat the lime kiln 100, together with the $CO_2$ from the reaction of Equation 3, desirably are fed through the scrubber 108. The scrubbed kiln gases 120 can then be emitted to the environment 121, e.g., the atmosphere.

Exemplary Embodiment of an Apparatus for a Lime Recovery Process

Figure 2:
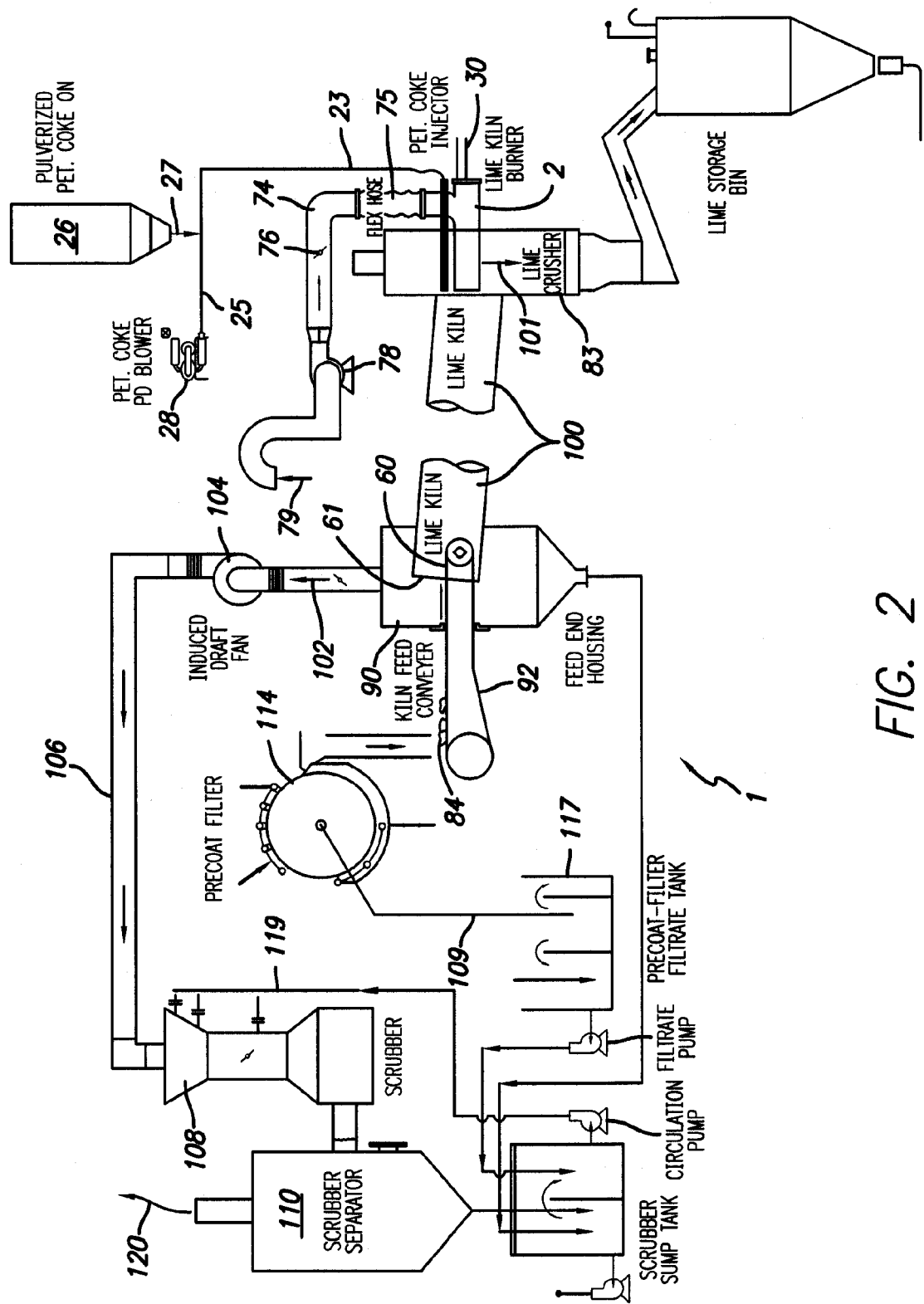
FIG. 2 illustrates a schematic of an exemplary apparatus for recovery of quick lime.

FIG. 2 illustrates a schematic of one embodiment of an apparatus 1 for recovering lime in an industrial process, such as a wood pulp manufacturing process. The apparatus 1 shown in FIG. 2 implements at least portions of the lime recovery cycle 200 described above and illustrated in FIG. 1.

In the apparatus shown in FIG. 2, the lime mud precoat filter 114 removes solids from the washed lime sludge 116 (see FIG. 1) and deposits wet lime sludge 84 on a kiln feed conveyor 92 configured to deliver the wet lime sludge 84 to the entrance 61 to the kiln 100. Preferably, the filter 114 is configured to strain precipitated $CaCO_3$ from a solution having dissolved NaOH, such as a solution resulting from rinsing the lime sludge with water.

Typically, the rinse solution added to the lime mud precoat filter 114 can be controlled to reduce the likelihood of any remaining sodium from being entrained in the thickened lime sludge 84. With respect to the exemplary lime mud precoat filter 114, the rinse solution can be controlled (e.g., flow rate, NaOH concentration) to maintain the sodium entrained in the thickened lime sludge 84 at a sodium-to-sulfur molar ratio of about 2:1 with respect to the sulfur in the gas products 102.

In the exemplary kiln 100, the co-fired kiln burner 2 (also see FIG. 3) is disposed at an end opposite the entrance 61 to the kiln 100. In one embodiment, after the conveyor 92 deposits a thickened lime sludge 84 into the entrance 61 of the kiln 100, the thickened lime sludge moves countercurrent to a flow of gas products 102 (e.g., carbon dioxide, $CO_2$, various oxides of nitrogen, NO and various oxides of sulfur, $SO_x$, arising as, for example, products of combustion, evaporated wash and reburned lime sludge) toward the end having the co-fired burner 2 as the kiln 100 rotates about a longitudinal axis of the kiln. In this exemplary embodiment, the kiln is sloped downwardly from the entrance 61 to the end having the co-fired burner such that the lime "rolls" in a cascading fashion within the kiln. Although not a feature of all kilns (e.g., kilns having a lesser slope from the entrance to the exit), the exemplary kiln includes an internal dam for retaining the lime sludge 84 within the kiln for a longer period of time as compared to a kiln without the dam and having the same slope, increasing the time available for the reaction of equation 3 to complete.

The heated lime sludge 80 (FIG. 3) undergoes the reaction of Equation 3, e.g., reburning. At the entrance 61 to the lime kiln 100, the temperature can range, for example, from about 450° F. to about 650° F. At the end with the burner 2, the temperature can range, for example, from about 1750° F. to about 1950° F.

After reburning, recovered lime 101 can be deposited in a lime crusher 83 in preparation for introduction into the slaker 150 (see FIG. 1).

A primary air supply for the kiln 100 enters an air intake 79 in fluid connection with a primary blower 78. The primary blower 78 provides sufficient head to deliver a primary air supply to the kiln 100, such as between about 500 cubic feet per minute (CFM) and about 1000 CFM. A damper 76, such as a throttle valve, can be used to control a flow rate of the primary air supply. The throttle valve can be, for example, a butterfly valve. A fluid conduit 74 conveys the air supply from the blower 78 to the kiln 100, and can incorporate a flexible segment 75 for accommodating vibration and various tolerances in the assembly 1.

Although not necessary for implementing the Miller Process, the co-fired burner 2 shown in FIG. 2 can receive two fuels, for example a pulverized solid fuel (such as pulverized petroleum coke) and a fuel for providing a continuous ignition source (such as natural gas) for maintaining ignition of the pulverized solid fuel. A blower 28 can provide sufficient head to an airstream for entraining a pulverized solid fuel and injecting the entrained fuel in to the burner 2. In some embodiments, the blower 28 delivers between about 550 CFM to about 850 CFM through a pipe with an approximately six-inch inner diameter. Pulverized solid fuel can be delivered from a pulverized solid fuel storage bin 26 by a pipe 27, such as a duct, for conveying the solid fuel to the entrainment stream conveyed by the fluid connection 25. A pipe 23 carries the entrained solid fuel stream 22 (see FIG. 3) to the burner 2.

In the illustrated embodiment, a plenum 90 collects gas products 102 from the lime kiln exhaust, including products of combustion from the co-fired burner 2 and any products from reburning the lime sludge 84. A stream of lime kiln exhaust gases enters an induced-draft fan 104 used to draw exhaust from the lime kiln 100. A fluid conduit 106 between the outlet side of the induced-draft fan 104 and the scrubber 108 carries the gas products 102 to the scrubber 108.

Some representative scrubbers are gas atomized (e.g., high pressure drop) Venturi scrubbers. The scrubber 108 can be a caustic scrubber. Many Venturi scrubbers have a sudden expansion at the Venturi inlet (e.g., from the inlet duct to the scrubber) into a larger diameter convergent-divergent "cone," or nozzle. Liquid for scrubbing gas products 102 (conventionally water, but in the exemplary embodiment, a solution 119, such as the filtrate 109) can be introduced to the scrubber (e.g., at or near the throat of the Venturi) for mixing with the gas products 102 and washing the walls of any buildup that may occur. For example, the scrubber 108 can be supplied with the solution 119 containing sodium ion from the weak liquor storage 117, as in the Miller Process. As with other Venturis, Venturi action, e.g., mixing, takes place near the throat.

For example, the liquid 102 (which can be recycled as indicated by FIG. 2) can be delivered to the converging portion of the Venturi, where the kiln exhaust from the conduit 106 accelerates. The speed of the exhaust can approach, under some conditions, about 100,000 ft/min through the throat. At such high velocities, the stream of gas products 102 can atomize the injected scrubber liquid (which can later be separated from the gas stream in the separator 110, as described below). A pressure drop across the throat of the Venturi can be used as a measure of scrubbing efficiency.

The small droplets can interact (e.g., by way of increased surface area) with the gas products 102. Such interaction can remove particulate, and can also place chemicals, such as NaOH, that have been added to the liquid, e.g., the solution 119, in close contact with components of the exhaust gas, such as $SO_x$.

A slurry resulting from such scrubbing, particularly with a Venturi scrubber, can move at a relatively high-speed ("high-speed slurry"), and can be injected in an impinging stream into a flooded tank (e.g., an "elbow tank"). Such a flooded tank is shown near the base of the scrubber shown in FIG. 2. The high-speed slurry can subsequently be injected into a separator vessel, such as the separator 110, where solid particulate in the slurry can be separated from liquid, for example, by way of a cyclonic separation process.

After passing through the scrubber 108 and a separator 110 for removing condensates, the scrubbed exhaust 120 can have a lower concentration of $SO_x$ than the kiln exhaust 102. In some instances, sufficient $SO_x$ can be removed to allow the scrubbed exhaust 120 to be emitted to the environment, most typically the atmosphere, and still meet environmental regulations.

Supplying the scrubber with solution from the liquor storage 117 can cause the amount of filtrate 109 to be at least partially proportional to the amount of lime sludge being processed and substantially proportional to a rate at which $SO_x$ is produced in the kiln 100. Consequently, available solution 119 from the liquor storage 117 can be in part proportional to a rate of lime recovery and a rate of $SO_x$ production, to the extent the filtrate 109 from the liquor storage 117 is used to provide the solution 119, rather than using additional (e.g., make-up) water, as is common in the prior scrubbing art. Because the solution 119 is a product of the lime recovery process, using this solution for charging the scrubber 108 can reduce costs, water consumption and waste.

Passing the kiln gases 102 through the scrubber 108, as shown in the recovery cycle 200 (see FIG. 1), provides an efficient and cost effective method of removing excess $SO_x$ from the kiln gases 102. Particularly valuable is that the amount of solution 119 having sodium available for charging the scrubber 108 is at least partially proportionate to the amount of reburnt lime sludge and the rate of $SO_x$ production. Thus, the scrubbing portion of the recovery cycle 200 can largely be performed without significant addition of material, thereby saving on material costs. Of course, the scrubber 108 can also be charged by an external source of sodium for scrubbing the excess $SO_x$ from the kiln gases 102, if desired.

Exemplary Co-Fired Burner

Figure 3:
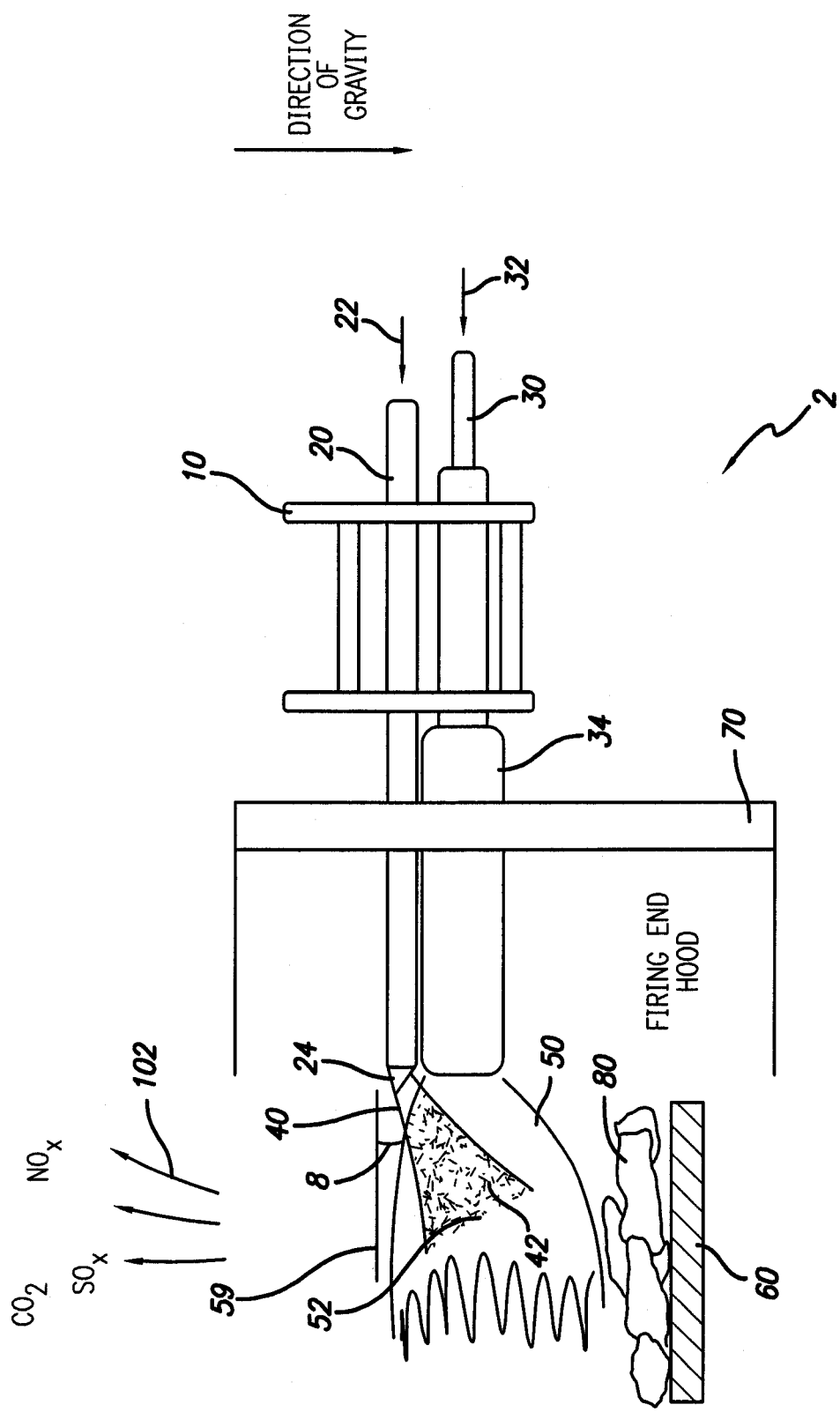
FIG. 3 illustrates a schematic of an exemplary co-fired burner that can be used in an apparatus for industrial waste recovery processes, such as the recovery of quicklime.

FIG. 3 illustrates an exemplary co-fired kiln burner 2 that can be used to heat a kiln, such as the kiln 100. The exemplary burner 2 is configured for co-fired combustion, such as combustion of a fuel capable of continuous combustion (e.g., natural gas) and combustion of a second fuel, such as a fuel having a high combustion temperature (e.g., a pulverized solid fuel, such as petroleum coke). As shown in FIG. 3, the burner 2 comprises a first fuel injector 34 for providing a continuous ignition source for igniting a high-combustion-temperature fuel from a second injector (such as, for example, the nozzle 24). The burner illustrated in FIG. 3, a frame 10 supports injector body 20 and the main burner 30, which extend through the firewall 70 isolating the firing end of the kiln 100 from the environment. The exemplary firewall partially forms a firing end hood disposed about the first and second injectors. An exemplary injector body 20 is a pipe with an approximately four-inch inner diameter in fluid connection with the pipe 23 (FIG. 2) carrying entrained pulverized solid fuel.

A typical ignition temperature of a pulverized solid fuel can be about 1800° F. As noted, some embodiments of co-fired burners are natural gas co-fired burners that continuously burn natural gas for igniting the solid fuel.

An inlet stream 22 of solid fuel, such as a stream of air with entrained particles of petroleum coke, can enter the body 20 at a first end and be discharged at a second end having an injector nozzle 24. In some embodiments, the inlet stream 22 delivers between about 550 CFM and about 850 CFM of air and entrained fuel, carrying between about 50 pounds per minute and about 60 pounds per minute (lbs/min) of entrained fuel, such as pulverized petroleum coke.

The nozzle 24 desirably can be configured as a pulverized solid-fuel injector nozzle, such as a nozzle for injecting pulverized petroleum coke into a continuous ignition source from above. In the illustrated embodiment, the nozzle 24 injects pulverized petroleum coke at an angle 8 between about 15 degrees and about 25 degrees below a horizontal line 59. In other words, the illustrated nozzle 24 turns the inlet stream 22 by about 15 degrees and about 25 degrees in the direction of gravity. In at least one embodiment, the nozzle is formed by approximately cutting in half a 45-degree bend configured for a four inch inner-diameter pipe to form a pipe fitting having about a 22.5-degree bend.

As noted above, a main burner 30 can provide a continuous ignition source for igniting a high-combustion-temperature fuel. An inlet stream of fluid fuel 32 (e.g., gaseous natural gas) enters the burner 30. In the illustrated embodiment, the main burner 30 is configured as a natural gas burner for continuously burning between about 10,000 cubic feet per hour (10 MCF) and about 75,000 cubic feet per hour (75 MCF). The illustrated fuel injector 34 is a natural gas injector having a plurality of turning vanes (not shown) to enhance mixing of the fuel stream 32 with an oxidizer, such as, for example, air.

In the embodiment shown in FIG. 3, the injection stream 40 of a pulverized solid fuel mixes with the continuous ignition source 50. In the case of a natural gas burner, the ignition source 50 is a continuous flame produced by burning the injection stream of the natural gas. Individual particles 42 of a pulverized fuel burn when mixed with the ignition source 50. A resulting flame 52 can be generally characterized as less intense and at a lower temperature than a flame resulting from burning the fluid fuel 32 alone. A desirable flame reduces erosion of refractory materials within the kiln 100 and also reduces the tendency of the kiln exhaust 102 to entrain $CaCO_3$ dust from the lime sludge 80. Mixing of the solid fuel particles 42 with the continuous ignition source 50 can be enhanced by the presence of turning vanes in the vicinity of the nozzle 24 inside the kiln.

In the illustrated embodiment, heated lime sludge 80 passes beneath the flame 52 within the kiln 100. The flame 52 can be controlled (e.g., temperature) by adjusting the damper 76 (see FIG. 2) to control the primary air supply, by adjusting the blower 28 to control the air volume of the fluid supply inlet stream 22, and/or by adjusting fuel flow rates. Desirably, the resulting flame 52 is a short bushy flame that "licks" the bed of the lime sludge 80 (the flame contacts the surface of the lime sludge). Co-fired burners as described herein typically provide better control of a flame than a burner configured to burn only natural gas.

By placing the nozzle 24 above the fuel injector 34 as shown by FIG. 3, the flame can be better controlled to achieve a particular intensity, e.g., temperature, flowrate, and degree of interaction with or licking of the bed of lime sludge 80. In addition, co-fired burners typically provide better control of the flame 52 in a calcining zone than a single fuel burner, e.g., a natural gas burner. For example, co-fired flames are typically shorter and bushier compared to a single-fuel (e.g., natural gas) flame, which is typically also more intense. Consequently, a co-fired burner can provide better control of temperature and heat intensity throughout a larger portion of a calcining zone than a single fuel, natural gas burner. In certain embodiments, the flame from a co-fired burner is controlled to have a temperature ranging between about 1750° F. to about 1950° F. for the lime 101 as it exits the kiln 100.

Combustion in a co-fired burner 2, together with reburning lime sludge 80, produces gaseous products 102. As noted above, these typically include carbon dioxide, various oxides of sulfur ($SO_x$) and various oxides of nitrogen ($NO_x$). However, by maintaining the flame temperature below about 2800° F., the temperature at the firing end of the kiln (e.g., at the end with the burner 2) can be maintained within a range to sufficiently reduce emissions of NO to meet many statutory emissions requirements. In certain embodiments, a temperature at a firing end of the kiln 100 can be maintained in the range between about 1750° F. and about 2500° F., and between about 1750° F. and about 1950° F. in certain embodiments. In addition, lower flame temperatures as delivered by co-fired burners can further reduce $SO_x$ concentrations in the gas products 102.

In reburning lime sludge 80, however, $CaCO_3$ and calcium sulfate ($CaSO_4$) tend to accumulate on interior walls of the kiln 100, degrading kiln performance. In addition, $CaCO_3$ and $CaSO_4$ tend to accumulate, on the blower of the induced draft fan 104, causing the blower to drift out of balance and degrade in performance. In addition, high concentrations of $SO_x$ generally increase the accumulation of $CaCO_3$ and $CaSO_4$ on the kiln walls and blower.

In a co-fired burner fueled in part by petroleum coke, the resulting flame can be maintained to provide a peak temperature in the calcining zone of the kiln 100 sufficient to intentionally vaporize the sodium contained in lime sludge 80. In particular embodiments, the flame temperature is maintained to provide a peak temperature in the calcining zone of the kiln in the range of above about 2250° F. to about 2500° F. Such vaporized sodium can in turn chemically react with high concentrations of $SO_x$ in the gas products 102. Interaction of the sodium with the $SO_x$ can reduce, and in some cases eliminate, accumulation of $CaCO_3$ and $CaSO_4$ inside the kiln and maintain performance of kiln refractory and the induced draft fan 104. Before emitting the kiln gases 102 to the environment, the gases can be passed through a scrubber, such as the scrubber 108 previously described, to remove at least some of the excess $SO_x$ and comply with emissions requirements.

In addition to reducing excess emissions and accumulation of $CaCO_3$ and $CaSO_4$, a co-fired burner can significantly reduce operating costs of recovering useful chemicals from industrial waste. Typically, petroleum coke is less expensive than natural gas when the cost of each is normalized according to its respective available energy from combustion. In a working embodiment of the lime recovery process, natural gas consumption dropped from about 75 MCF when using a natural gas only burner to between about 10 and about 20 MCF using a co-fired burner configured to burn petroleum coke using a natural gas flame as the continuous ignition source. This large drop in natural gas usage and corresponding costs can more than offset incremental additional costs of petroleum coke.

In view of the many possible embodiments to which the principles of the disclosed innovations may be applied, it should be recognized that the illustrated embodiments are only examples and should not be taken as limiting the scope of the following claims. I therefore claim as my invention all possible embodiments and their equivalents that come within the scope of these claims.

I claim:

1. A method for recovering lime from a manufacturing process, the method comprising:
    baking lime sludge in a kiln;
    controlling a flame temperature of a flame in a calcining zone of the kiln so as to vaporize sodium contained in the lime sludge, wherein interaction of the vaporized sodium with $SO_x$ deters accumulation of one or both of $CaCO_3$ and $CaSO_4$ on one or more inner surfaces of the kiln; and
    co-firing petroleum coke with natural gas to produce the flame, wherein co-firing petroleum coke with natural gas comprises burning natural gas to produce a primary ignition source and injecting petroleum coke downwardly into the primary ignition source.

2. The method of claim 1, wherein the act of controlling the flame temperature comprises one or more of selecting a volumetric flow rate of an oxidizer, selecting a volumetric flow rate of a fuel-supply inlet stream carrying entrained particles of petroleum coke, and selecting respective flow rates of petroleum coke and fluid fuel.

3. The method of claim 2, wherein a volumetric flow rate of a fuel-supply stream is between about 550 CFM and about 850 CFM.

4. The method of claim 2, wherein a flow rate of petroleum coke is between about 50 pounds per minute and about 60 pounds per minute.

5. The method of claim 2, wherein the fluid fuel flow rate comprises a natural gas flow rate between about 10 MCF and about 20 MCF.

6. The method of claim 1, wherein the act of controlling the flame temperature comprises controlling the flame temperature of the flame so that a temperature in a calcining zone of the kiln is above about 2250° F.

7. The method of claim 1, wherein a fluid-fuel injector provides a flow of natural gas that is burned to produce the primary ignition source, and the petroleum coke is injected into the primary ignition source from an injector body that is positioned above the fluid-fuel injector and has an outlet nozzle that injects the petroleum coke downwardly into the primary ignition source.

8. The method of claim 7, wherein the injector body comprises a tube having an inner-diameter of about 4 inches and a fuel-supply stream of air with entrained particles of petroleum coke is injected into the primary ignition source from the injector body.

9. A method for recovering lime from a manufacturing process, the method comprising:
    baking lime sludge in a kiln;
    controlling a flame temperature of a flame so that a temperature in a calcining zone of the kiln is above about 2250° F. to vaporize sodium contained in the lime sludge, wherein interaction of the vaporized sodium with $SO_x$ deters accumulation of one or both of $CaCO_3$ and $CaSO_4$ on one or more inner surfaces of the kiln; and
    wherein:
    the lime sludge, prior to entering the kiln, is rinsed with a rinse to generate a filtrate comprising dissolved NaOH;
    the act of baking the rinsed lime sludge in the kiln causes the kiln to exhaust at least some SOx;
    at least a portion of the SOx is scrubbed in a scrubber at least partially charged with the filtrate comprising dissolved NaOH.

10. The method of claim 9, further comprising:
    removing quick lime from the kiln.

11. A method for recovering lime from a manufacturing process, the method comprising:
    baking lime sludge in a kiln;
    controlling a flame temperature of a flame so that a temperature in a calcining zone of the kiln is above about 2250° F. to vaporize sodium contained in the lime sludge, wherein interaction of the vaporized sodium with $SO_x$ deters accumulation of one or both of $CaCO_3$ and $CaSO_4$ on one or more inner surfaces of the kiln; and
    wherein the flame is produced by:
    continuously burning natural gas for providing a primary ignition source in the kiln; and
    injecting petroleum coke into the primary ignition source from above such that the petroleum coke is ignited in the kiln.

12. A method for recovering lime from a manufacturing process, the method comprising:
baking lime sludge in a kiln;
controlling a flame temperature of a flame so that a temperature in a calcining zone of the kiln is above about 2250° F. to vaporize sodium contained in the lime sludge, wherein interaction of the vaporized sodium with $SO_x$ deters accumulation of one or both of $CaCO_3$ and $CaSO_4$ on one or more inner surfaces of the kiln; and wherein:
the kiln comprises an entrance region for receiving lime sludge, the entrance region being opposite the calcining zone; and
the kiln further comprises a co-fired burner for burning pulverized solid fuel in the calcining zone, wherein the co-fired burner comprises a fluid-fuel injector for providing a continuous ignition source and an injector body positioned above the fluid-fuel injector for injecting a pulverized solid fuel downwardly into the continuous ignition source.

13. The method of claim 12, wherein the fluid-fuel injector comprises one or more turning vanes for mixing a fluid fuel with an oxidizer.

14. The method of claim 12, wherein the injector body comprises:
a nozzle for turning a stream of the solid fuel between about 15 degrees and about 25 degrees.

15. The method of claim 12, wherein the injector body comprises a tube having an inner-diameter of about 4 inches.

16. The method of claim 12, further comprising injecting petroleum coke from the injector body into the continuous ignition source from the fluid-fuel injector to produce the flame.

17. The method of claim 12, wherein the calcining zone is positioned below the co-fired burner.

18. The method of claim 12, further comprising injecting a pulverized solid fuel from the injector body into the continuous ignition source from the fluid-fuel injector to produce the flame.

19. The method of claim 15, wherein a volumetric flow rate of the fuel-supply stream through the injector body is between about 550 CFM and about 850 CFM.

* * * * *